(12) United States Patent
Chen et al.

(10) Patent No.: US 11,191,081 B2
(45) Date of Patent: Nov. 30, 2021

(54) METHOD AND APPARATUS FOR MEASUREMENT AND REPORTING FOR REFERENCE SIGNAL

(71) Applicant: GUANGDONG OPPO MOBILE TELECOMMUNICATIONS CORP., LTD., Guangdong (CN)

(72) Inventors: Wenhong Chen, Dongguan (CN); Zhi Zhang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 57 days.

(21) Appl. No.: 16/623,521

(22) PCT Filed: Jun. 23, 2017

(86) PCT No.: PCT/CN2017/089824
§ 371 (c)(1),
(2) Date: Dec. 17, 2019

(87) PCT Pub. No.: WO2018/232751
PCT Pub. Date: Dec. 27, 2018

(65) Prior Publication Data
US 2021/0029713 A1    Jan. 28, 2021

(51) Int. Cl.
*H04W 72/06* (2009.01)
*H04L 5/00* (2006.01)
(Continued)

(52) U.S. Cl.
CPC ............. *H04W 72/06* (2013.01); *H04L 5/005* (2013.01); *H04W 8/24* (2013.01); *H04W 24/10* (2013.01);
(Continued)

(58) Field of Classification Search
CPC ....... H04W 72/06; H04W 8/24; H04W 24/10; H04W 72/042; H04W 72/1247;
(Continued)

(56) References Cited

U.S. PATENT DOCUMENTS

2012/0236817 A1    9/2012   Chen
2013/0077581 A1    3/2013   Lee
(Continued)

FOREIGN PATENT DOCUMENTS

CN    101777965 A    7/2010
CN    103391154 A    11/2013
(Continued)

OTHER PUBLICATIONS

Supplementary European Search Report in the European application No. 17914469.6, dated May 20, 2020.
(Continued)

*Primary Examiner* — Kiet Tang

(57) ABSTRACT

The embodiments of the application provide a wireless communication method and device, which may implement measurement and feedback of reference signals to support transmission of multiple downlink channels. The method includes that: a terminal device measures multiple reference signals; the terminal device determines reporting information corresponding to each reference signal of the multiple reference signals and including a Rank Indicator (RI) according to a measurement result; and the terminal device transmits the reporting information corresponding to each reference signal and including the RI to a network side.

18 Claims, 3 Drawing Sheets

100

A terminal device measures multiple reference signals — 110

The terminal device determines reporting information corresponding to each reference signal of the multiple reference signals and including an RI according to a measurement result — 120

The terminal device transmits the reporting information corresponding to the each reference signal and including the RI to a network side — 130

(51) Int. Cl.
*H04W 8/24* (2009.01)
*H04W 24/10* (2009.01)
*H04W 72/04* (2009.01)
*H04W 72/12* (2009.01)

(52) U.S. Cl.
CPC ..... *H04W 72/042* (2013.01); *H04W 72/1247* (2013.01)

(58) Field of Classification Search
CPC ........ H04W 72/04; H04W 8/22; H04L 5/005; H04L 1/0026; H04L 1/00; H04L 5/00
See application file for complete search history.

(56) References Cited

U.S. PATENT DOCUMENTS

| | | | |
|---|---|---|---|
| 2015/0117385 A1 | 4/2015 | Lee et al. | |
| 2016/0006553 A1 | 1/2016 | Kim et al. | |
| 2016/0204845 A1* | 7/2016 | Kim | H04B 7/0626 370/329 |
| 2016/0277081 A1* | 9/2016 | Wei | H04B 7/0639 |
| 2016/0353458 A1 | 12/2016 | Lee et al. | |
| 2018/0063736 A1* | 3/2018 | Sadeghi | H04W 24/10 |
| 2018/0213539 A1 | 7/2018 | Lee et al. | |
| 2018/0367268 A1* | 12/2018 | Deng | H04L 5/0073 |
| 2019/0182697 A1* | 6/2019 | Zhang | H04B 7/088 |

FOREIGN PATENT DOCUMENTS

| | | |
|---|---|---|
| CN | 104601286 A | 5/2015 |
| CN | 104995929 A | 10/2015 |
| JP | 2015529053 A | 10/2015 |
| JP | 2016513430 A | 5/2016 |
| JP | 2017503417 A | 1/2017 |
| JP | 2017063465 A | 3/2017 |
| JP | 2018522474 A | 8/2018 |
| JP | 2018530943 A | 10/2018 |
| RU | 2520358 C1 | 6/2014 |
| WO | 2012152037 A1 | 11/2012 |
| WO | 2013043015 A1 | 3/2013 |

OTHER PUBLICATIONS

Written Opinion of the International Search Authority in the international application No. PCT/CN2017/089824, dated Mar. 21, 2018.

Intel Corporation: "Discussion on rank indicator (RI) report for CoMP", 3GPP DRAFT: R1-122631 Discussion on Rank Indicator Reports (RI) for Comp, 3rd Generation Partnership Project (3GPP), vol. RAN WG1, No. Prague, Czech; May 21, 2012-May 25, 2012, May 12, 2012 (May 12, 2012), XP050600816, [ retrieved on May 12, 2012] * the whole document *.

ZTE: "Discussion on DL beam management", 3GPP DRAFT: R1-1710183 Discussions on DL Beam Management, 3rd Generation Partnership Project (3GPP), vol. RAN WG1, No. Qingdao, P.R. China; Jun. 27, 2017-Jun. 30, 2017 Jun. 17, 2017 (Jun. 17, 2017), XP051304858, Retrieved from the Internet: URL: http://www.3gpp.org/ftp/tsg_ran/WG1 RL1/TSGR1 AH/NR AH 1706/Docs/ [ retrieved on Jun. 17, 2017] * sections 1-3 *.

International Search Report in the international application No. PCT/CN2017/089824, dated Mar. 23, 2018.

Written Opinion of the International Search Authority in the international application No. PCT/CN2017/089824, dated Mar. 23, 2018.

Intel Corporation; "Support of NC-JT in NR", 3GPP TSG RAN WG1 Meeting #89, R1-1707353, Hangzhou, P.R. China May 15-19, 2017.

AT&T; "Support multiple DCI based transmission", 3GPP TSG RAN WG1 Meeting #89, R1-1707760, Hangzhou, China, May 15-19, 2017.

Samsung; "Discussions on NR DL multi-TRP and multi-panel support", 3GPP TSG RAN WG1 Meeting #89, R1-1707948, Hangzhou, China, May 15-19, 2017.

First Office Action of the Russian application No. 2019142733, dated Oct. 14, 2020.

First Office Action of the Canadian application No. 3066825, dated Mar. 2, 2021.

First Office Action of the Indian application No. 201917052067, dated Mar. 31, 2021.

First Office Action of the Japanese application No. 2019-569879, dated Jun. 11, 2021.

Written Opinion of the Singaporean application No. 11201912158U, dated Jun. 22, 2021.

First Office Action of the Korean application No. 10-2019-7038196, dated Jul. 8, 2021.

3GPP TSG-RAN WG1 #89ah-NR R1-1711015, Qingdao, China, Jun. 27-30, 2017, Source: Ericsson, Title: On DL beam indication, Agenda Item: 5.1.2.2.1, Document for: Discussion and Decision.

* cited by examiner

METHOD AND APPARATUS FOR MEASUREMENT AND REPORTING FOR REFERENCE SIGNAL

TECHNICAL FIELD

The application relates to the field of communications, and more particularly to a wireless communication method and device.

BACKGROUND

In a present New Radio (NR) system, multiple transmission nodes may jointly transmit Physical Downlink Control Channels (PDCCHs) or Physical Downlink Shared Channels (PDSCHs) to a terminal device.

Therefore, how to implement measurement and feedback of reference signals to support transmission of multiple downlink channels is a problem urgent to be solved.

SUMMARY

Embodiments of the application provide a wireless communication method and device, which may implement measurement and feedback of reference signals to support transmission of multiple downlink channels.

A first aspect provides a wireless communication method, which may include the following operations:

multiple reference signals are measured by a terminal device;

reporting information corresponding to each reference signal of the multiple reference signals and including a Rank Indicator (RI) according to a measurement result is determined by the terminal device; and the reporting information corresponding to the each reference signal and including the RI is transmitted by the terminal device to a network side.

In combination with the first aspect, in a possible implementation mode of the first aspect, the multiple reference signals may be from multiple transmission nodes for jointly serving the terminal device or from multiple downlink transmission beams.

In combination with the first aspect or any abovementioned possible implementation mode, in another possible implementation mode of the first aspect, the operation that the reporting information corresponding to each reference signal and including the RI to the network side is transmitted by the terminal device may include the following operation:

the reporting information corresponding to the each reference signal and including the RI is transmitted by the terminal device to a transmitter of the reference signal.

In combination with the first aspect or any abovementioned possible implementation mode, in another possible implementation mode of the first aspect, a value of the R in the reporting information corresponding to the each reference signal may be smaller than or equal to a value corresponding to a capability of the terminal device and/or smaller than or equal to the number of a port of the each reference signal configured for the terminal device.

In combination with the first aspect or any abovementioned possible implementation mode, in another possible implementation mode of the first aspect, a sum of the values of the RIs in the reporting information corresponding to the multiple reference signals may be smaller than or equal to a value corresponding to a capability of the terminal device.

In combination with the first aspect or any abovementioned possible implementation mode, in another possible implementation mode of the first aspect, the operation that the reporting information corresponding to each reference signal and including the RI is transmitted by the terminal device to the network side may include the following operation:

a first message is transmitted to a transmitter of at least one first reference signal of the multiple reference signals, wherein the first message includes reporting information corresponding to the first reference signal and including an RI, the first message may further include an RI in reporting information corresponding to at least one second reference signal of the multiple reference signals.

In combination with the first aspect or any abovementioned possible implementation mode, in another possible implementation mode of the first aspect, a sum of values of the RIs in the reporting information corresponding to the multiple reference signals may be greater than the value corresponding to a capability of the terminal device.

In combination with the first aspect or any abovementioned possible implementation mode, in another possible implementation mode of the first aspect, a value of the RI in the reporting information corresponding to the each reference signal may be smaller than or equal to a maximum value of the RI in the reporting information corresponding to the each reference signal; or, a sum of values of the RIs in the reporting information corresponding to the multiple reference signals is smaller than or equal to a maximum value of the sum of the values of the RIs in the reporting information corresponding to the multiple reference signals.

In combination with the first aspect or any abovementioned possible implementation mode, in another possible implementation mode of the first aspect, the operation that the reporting information corresponding to the each reference signal of the multiple reference signals and including the RI is determined by the terminal device according to the measurement result may include the following operations:

the maximum value of the RI in the reporting information corresponding to the each reference signal is determined by the terminal device according to a capability of the terminal device; and the reporting information corresponding to the each reference signal and including the RI is determined according to the measurement result and the maximum value of the RI in the reporting information corresponding to the each reference signal.

In combination with the first aspect or any abovementioned possible implementation mode, in another possible implementation mode of the first aspect, the maximum value of the RI in the reporting information corresponding to the each reference signal may be obtained by rounding down a value obtained by dividing the value corresponding to the capability of the terminal device by the number of the multiple reference signals.

In combination with the first aspect or any abovementioned possible implementation mode, in another possible implementation mode of the first aspect, the method may further include the following operation:

first configuration information is received by the terminal device from the network side, the first configuration information being configured to indicate:

the maximum value of the RI in the reporting information corresponding to the each reference signal; and/or, the maximum value of the sum of the values of the RIs in the reporting information corresponding to the multiple reference signals.

In combination with the first aspect or any abovementioned possible implementation mode, in another possible implementation mode of the first aspect, the first configuration information of different reference signals may be distinguished through indexes of the different reference signals.

In combination with the first aspect or any abovementioned possible implementation mode, in another possible implementation mode of the first aspect, the first configuration information may be carried in setting configurations of the different reference signal, or carried in a triggering signal for triggering the terminal device to measure the different reference signals, or carried in Downlink Control Information (DCI) dedicated to the first configuration information.

In combination with the first aspect or any abovementioned possible implementation mode, in another possible implementation mode of the first aspect, the first configuration information of different reference signals may be distinguished through indexes of the reporting information.

In combination with the first aspect or any abovementioned possible implementation mode, in another possible implementation mode of the first aspect, the first configuration information may be carried in a setting configuration of the reporting information, or carried in a triggering signal for triggering the terminal device for reporting, or carried in DC dedicated to the first configuration information.

In combination with the first aspect or any abovementioned possible implementation mode, in another possible implementation mode of the first aspect, the method may further include the following operation:

second configuration information is received by the terminal device from the network side, the second configuration information including the number of a port for each reference signal and a sum of the numbers of ports for the multiple reference signals being smaller than or equal to a value corresponding to a capability of the terminal device.

In combination with the first aspect or any abovementioned possible implementation mode, in another possible implementation mode of the first aspect, the method may further include the following operation:

third configuration information is received by the terminal device from the network side, the third configuration information being for indicating that reference signals to be measured are the multiple reference signals.

A second aspect provides a wireless communication method, which may include the following operations:

a first transmission node receives a first message from a terminal device, the first message including reporting information corresponding to a reference signal transmitted by the first transmission node and including an RI, and the first message also including an RI in reporting information corresponding to a reference signal transmitted by a second transmission node; and the first transmission node determines a layer amount of a transmission layer through which a downlink signal is transmitted to the terminal device according to the first message.

In combination with the second aspect, in a possible implementation mode of the second aspect, the operation that the first transmission node determines the layer amount of the transmission layer through which the downlink signal is transmitted to the terminal device according to the first message may include the following operation:

the first transmission node determines the layer amount of the transmission layer through which the downlink signal is transmitted to the terminal device according to the first message and a priority sequence of the first transmission node and the second transmission node.

In combination with the second aspect or any abovementioned possible implementation mode, in another possible implementation mode of the second aspect, the operation that the first transmission node determines the layer amount of the transmission layer through which the downlink signal is transmitted to the terminal device according to the priority sequence of the first transmission node and the second transmission node and the first message may include the following operation.

When priority of the first transmission node is higher than priority of the second transmission node, a value of the RI in the reporting information corresponding to the reference signal transmitted by the first transmission node is determined as the layer amount of the transmission layer through which the first transmission node transmits the downlink signal to the terminal device.

In combination with the second aspect or any abovementioned possible implementation mode, in another possible implementation mode of the second aspect, the operation that the first transmission node determines the layer amount of the transmission layer through which the downlink signal is transmitted to the terminal device according to the priority sequence of the first transmission node and the second transmission node and the first message may include the following operation:

when the priority of the first transmission node is lower than that of the second transmission node, a difference between a maximum amount of transmission layers supported by the terminal device and the value of the RI in the reporting information corresponding to the reference signal transmitted by the first transmission node is determined as the layer amount of the transmission layer through which the downlink signal is transmitted to the terminal device.

In combination with the second aspect or any abovementioned possible implementation mode, in another possible implementation mode of the second aspect, the operation that the first transmission node determines the layer amount of the transmission layer through which the downlink signal is transmitted to the terminal device according to the first message may include the following operation:

the first transmission node performs negotiation with the second transmission node about the layer amount of the transmission layer through which the downlink signal is transmitted to the terminal device according to the first message.

A third aspect provides a terminal device, which is configured to execute the method in the first aspect or any possible implementation mode of the first aspect. Specifically, the terminal device includes functional modules configured to execute the method in the first aspect or any possible implementation mode of the first aspect.

A fourth aspect provides a transmission node, which is configured to execute the method in the second aspect or any possible implementation mode of the second aspect. Specifically, the transmission node includes functional modules configured to execute the method in the second aspect or any possible implementation mode of the second aspect.

A fifth aspect provides a terminal device, which includes a processor, a memory and a transceiver. The processor, the memory and the transceiver communicate with one another through an internal connecting path to transmit control and/or data signals to enable the terminal device to execute the method in the first aspect or any possible implementation mode of the first aspect.

A sixth aspect provides a transmission node, which includes a processor, a memory and a transceiver. The processor, the memory and the transceiver may communicate with one another through an internal connecting path to transmit control and/or data signals to enable the transmission node to execute the method in the second aspect or any possible implementation mode of the second aspect.

A seventh aspect provides a computer-readable medium, which is configured to store a computer program, the computer program including an instruction for executing the method in each aspect or any possible implementation mode.

An eighth aspect provides a computer program product including an instruction, which runs on a computer to enable the computer to execute the method in each aspect or any possible implementation mode.

In such a manner, in the embodiments of the application, the terminal device measures multiple reference signals, the terminal device determines reporting information corresponding to each reference signal of the multiple reference signals and including an RI according to the measurement result, and the terminal device transmits the reporting information corresponding to the each reference signal and including the RI to the network side, so that measurement and feedback of the reference signals are implemented to support transmission of multiple downlink channels.

BRIEF DESCRIPTION OF DRAWINGS

In order to describe the technical solutions of the embodiments of the application more clearly, the drawings required to be used in descriptions about the embodiments or a conventional art will be simply introduced below. It is apparent that the drawings described below are only some embodiments of the application. Other drawings may further be obtained by those of ordinary skill in the art according to these drawings without creative work.

DETAILED DESCRIPTION

The technical solutions in the embodiments of the application will be described below in combination with the drawings in the embodiments of the application. It is apparent that the described embodiments are not all embodiments but part of embodiments of the application. All other embodiments obtained by those of ordinary skill in the art on the basis of the embodiments in the application without creative work shall fall within the scope of protection of the application.

Optionally, the technical solutions of the embodiments of the application may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5th-Generation (5G) system (which may also be called an NR system).

Figure 1:
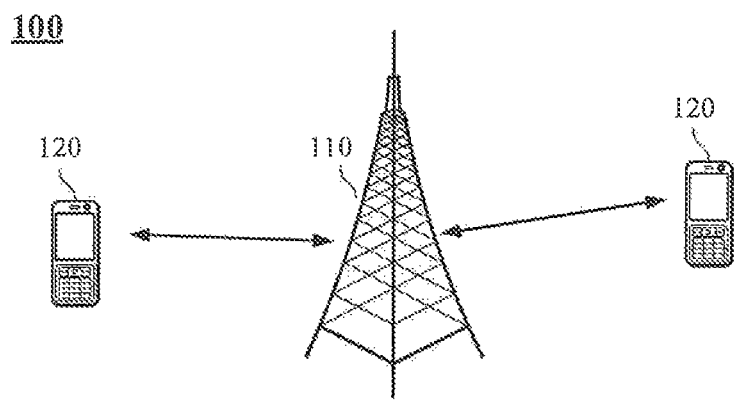
FIG. 1 is a schematic diagram of a wireless communication system according to an embodiment of the application.

FIG. 1 is a schematic diagram of a wireless communication system according to an embodiment of the application.

As shown in FIG. 1, multiple transmission nodes (for example, a transmission node 1 and a transmission node 2) may jointly transmit downlink channels or signals to a terminal device.

Or, a network side may transmit downlink channels or signals to the terminal device through multiple transmission beams (for example, a transmitting beam 1 and a transmitting beam 2).

The multiple transmission beams may be from the same transmission node or different transmission nodes.

Optionally, the terminal device in FIG. 1 may refer to an access terminal, User Equipment (UE), a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, a processing device connectable to a wireless modem, a vehicle-mounted device, a wearable device, a terminal device in a future 5G network, a terminal device in a future evolved Public Land Mobile Network (PLMN) or the like.

Optionally, the transmission node shown in FIG. 1 may be a device for communicating with the terminal device. The transmission node may provide communication coverage for a specific geographical region and may communicate with a terminal device (for example, UE) in the coverage. Optionally, the transmission node may be a Base Transceiver Station (BTS) in the GSM or the CDMA system, or a NodeB (NB) in the WCDMA system, or an Evolutional Node B (eNB or eNodeB) in an LTE system or a wireless controller in a Cloud Radio Access Network (CRAN). Or the transmission node may be a relay station, an access point, a vehicle-mounted device, a wearable device, a network-side device in a future 5G network, a network device in a future evolved PLMN or the like.

Optionally, the transmission node may be called a Transmission Reception Point (TRP).

Optionally, the multiple transmission nodes in the embodiments of the application may be controlled by the same control device. Or, the multiple transmission nodes in the embodiments of the application may include a master transmission node to control the other transmission nodes.

Optionally, the 5G system or network may also be called an NR system or network.

It is to be understood that terms "system" and "network" in the disclosure may usually be exchanged. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship. "A/an" and "the" in a singular form in the present disclosure and the appended claims are also intended to include a plural form, unless other meanings are clearly denoted throughout the present disclosure.

Figure 2:
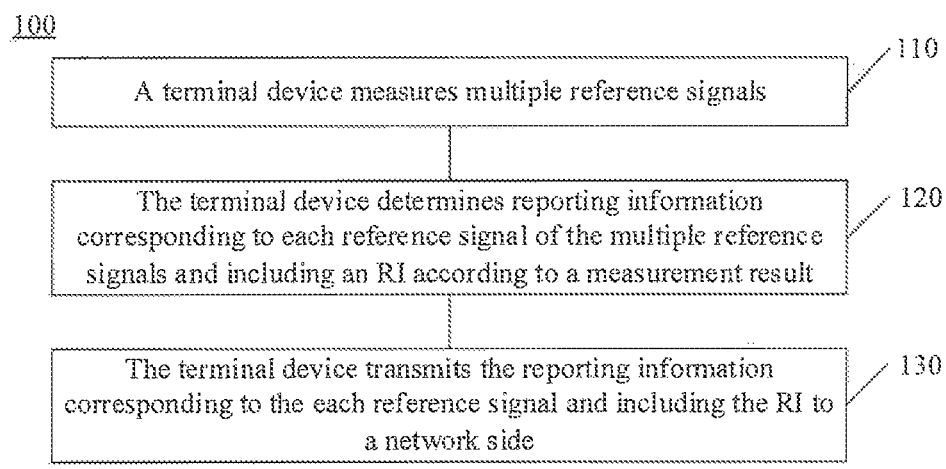
FIG. 2 is a schematic flowchart of a wireless communication method according to an embodiment of the application.

FIG. 2 is a schematic flowchart of a wireless communication method 200 according to an embodiment of the application. The method 100 may optionally be applied, but not limited, to the system shown in FIG. 1. As shown in FIG. 2, the method 100 includes at least part of the following contents.

In the operation 110, a terminal device measures multiple reference signals.

Optionally, the reference signals may be Channel State Information Reference Signals (CSI-RSs).

Optionally, the multiple reference signals may be from multiple transmission nodes which may jointly serve the terminal device or from multiple downlink transmission beams.

Optionally, the multiple reference signals may correspond to the multiple transmission nodes one to one, namely a transmission node transmits a reference signal. A reference signal refers to a downlink signal that is configured and transmitted.

Optionally, the multiple downlink beams may be from the same transmission node, or different downlink beams are from different transmission nodes.

Optionally, the multiple downlink transmission beams may correspond to the multiple reference signals one to one, namely a reference signal is transmitted through a downlink transmitting beam.

In the operation 120, the terminal device determines reporting information corresponding to each reference signal of the multiple reference signals according to a measurement result, the reporting information including an RI.

Optionally, a value of the RI is configured to represent a maximum amount of transmission layers supported by the terminal device in a transmission channel corresponding to the reference signal.

In the operation 130, the terminal device transmits the reporting information corresponding to each reference signal and including the RI to a network side.

Optionally, the terminal device may measure multiple signals to be measured at different times. Or, the terminal device may also report the reporting information corresponding to the reference signals at different times.

Optionally, feedback information in the embodiment of the application may include the RI and include an index of the reference signal or an index of the reporting information or an index of the transmission node.

Optionally, when the multiple reference signals are from different transmission nodes respectively, the terminal device may transmit, to the each transmission node, the reporting information corresponding to the reference signal transmitted by each transmission node.

Optionally, when the multiple reference signals are from different transmission beams respectively, the terminal device may transmit, to transmitters of the transmission beams, the reporting information corresponding to the reference signals transmitted by the transmitters respectively.

Optionally, a value of the RI in the reporting information corresponding to each reference signal is smaller than or equal to a value corresponding to a capability of the terminal device and/or smaller than or equal to the number of a port of the each reference signal configured for the terminal device.

The value corresponding to the capability of the terminal device may be the maximum amount of transmission layers supported by the terminal device. Then, the value of the RI in the reporting information corresponding to each reference signal is smaller than or equal to the maximum amount of transmission layers supported by the terminal device.

The number of a port of each reference signal configured for the terminal device (pre-configured during delivery or pre-configured by a network) may be a sum of amounts of ports that may be adopted by the terminal device for all the reference signals.

Optionally, a sum of the values of the RIs in the reporting information corresponding to the multiple reference signals is smaller than or equal to the value corresponding to the capability of the terminal device and/or smaller than or equal to the number of a port of each reference signal configured for the terminal device.

Specifically, the values of the RIs in the reporting information corresponding to the multiple reference signals are smaller than or equal to the maximum amount of transmission layers supported by the terminal device and/or smaller than or equal to the number of a port of each reference signal configured for the terminal device.

Therefore, in such an implementation mode, when the multiple transmission nodes are all connected with the terminal device and if backhauls among the multiple transmission nodes are not ideal, namely the transmission nodes may not rapidly implement information interaction with one another, system resource waste caused by the fact that layer amounts of data flows transmitted to the terminal device by the multiple transmission nodes exceed the capability of the terminal device and the terminal device may not implement demodulation or discard part of data may be avoided.

Optionally, in the embodiment of the application, the terminal device may also be configured with the port amount for each reference signal, and in such case, the value of the RI in the reporting information corresponding to each reference signal is smaller than the port amount configured for the reference signal.

Optionally, the terminal device transmits a first message to the transmitter of at least one first reference signal of the multiple reference signals, the first message including the reporting information corresponding to the first reference signal and including the RI. The first message further includes the RI in the reporting information corresponding to at least one second reference signal of the multiple reference signals, and may further include other information in the reporting information corresponding to the second reference signal.

Specifically, at the same time of transmitting the reporting information corresponding to at least one reference signal to the transmitter of the reference signal, the reporting information corresponding to one or more other reference signals (which may be transmitted by other transmitters) may also be transmitted to the transmitter of the reference signal.

For example, if there are three reference signals, for example, a reference signal 1, reference signal 2 and reference signal 3 from a transmission node 1, a transmission node 2 and a transmission node 3 respectively, reporting information corresponding to the reference signal 1 may be transmitted to the transmission node 1, reporting information corresponding to the reference signal 2 and the reference signal 3 may be transmitted to the transmission node 2, and the reporting information corresponding to the reference signal 1, the reference signal 2 and the reference signal 3 may be transmitted to the transmission node 3.

Whether to transmit reporting information corresponding to other reference signal to the transmitter of a certain reference signal or not may be determined according to a practical condition, and for example, may be determined according to priority of the transmission node. For example, if a transmission node has higher priority, reporting information corresponding to other reference signal is less needed to be transmitted to the transmission node. For the above example, the priority of the transmission node 1 is higher than that of the transmission node 2, and the priority of the transmission node 2 is higher than that of the transmission node 3.

When reporting information corresponding to one or more other reference signals (which may be transmitted by other transmitters) is also transmitted to the transmitter of a reference signal at the same time of transmitting the reporting information corresponding to the reference signal to the transmitter of at least one reference signal, the sum of the values of the RIs in the reporting information corresponding to the multiple reference signals is greater than the value corresponding to the capability of the terminal device.

Optionally, the value of the RI in the reporting information corresponding to each reference signal is smaller than or equal to a maximum value of the RI in the corresponding reporting information; or, the sum of the values of the RIs in the reporting information corresponding to the multiple reference signals is smaller than or equal to a maximum value of the sum of the values of the RIs in the reporting information corresponding to the multiple reference signals.

Optionally, the terminal device determines the maximum value of the RI in the reporting information corresponding to each reference signal according to the capability thereof, and determines the RI in the reporting information corresponding to each reference signal according to the measurement result and the maximum value of the RI in the reporting information corresponding to the each reference signal.

The maximum value of the RI in the reporting information corresponding to each reference signal may be obtained by rounding down a value obtained by dividing the value corresponding to the capability of the terminal device by the number of the multiple reference signals.

The number of the multiple reference signals may be equal to the number of PDCCHs required to be received at the same time, or the number of PDSCHs required to be received at the same time, or a sum of the numbers of the PDCCHs and PDSCHs required to be received at the same time (the PDCCHs and the PDSCHs are required to be received at the same time).

Optionally, the terminal device receives first configuration information from the network side, the first configuration information being configured to indicate: the maximum value of the RI in the reporting information corresponding to each reference signal; and/or, the maximum value of the sum of the values of the RIs in the reporting information corresponding to the multiple reference signals.

For easy understanding, how to transmit configuration information of different reference signals will be described below.

In an implementation mode, the first configuration information of different reference signals is distinguished through indexes of the reference signals.

In the implementation mode, the first configuration information may be carried in a setting configuration of the reference signal, or carried in a triggering signal for triggering the terminal device to measure the reference signal, or carried in DCI dedicated to the first configuration information.

The setting configuration of the reference signal may be a CSI-RS resource setting configuration or a CSI-RS setting configuration, and is to configure how to receive the reference signal.

In an implementation mode, the first configuration information of different reference signals is distinguished through indexes of the reporting information.

In the implementation mode, the first configuration information may be carried in a setting configuration of the reporting information, or carried in a triggering signal for triggering the terminal device for reporting, or carried in the DCI dedicated to the first configuration information. The setting configuration of the reporting information may be called a reporting setting configuration, and is to configure how to transmit the reporting information.

A manner for carrying the first configuration information will be described below with an example.

For example, in an NR system, a network side may transmit different NR-PDCCHs and/or NR-PDSCHs to a terminal device by use of two transmission nodes. For supporting such a transmission solution, the network side may transmit different CSI-RSs (recorded as a CSI-RS 1 and a CSI-RS 2 respectively, different CSI-RSs being distinguished through different CSI-RS resource indicators) by use of different transmission nodes and simultaneously configure the terminal device to measure two signals (correspondingly, there may be a CSI-RS resource setting configuration and a reporting setting configuration). For avoiding scheduling layers which exceeds a demodulation capability of UE, the NW may adopt the following two processing manners:

in a manner, the network side configures maximum feedback RI value (N1, N2) for CSI-RS 1 and CSI-RS 2 respectively, for example, specifying the maximum feedback RI value (N1, N2) in the CSI-RS setting configurations, or specifying the maximum feedback RI value (N1, N2) in a triggering signal for signal measurement, or specifying the maximum feedback RI value (N1, N2) in dedicated DCI;

in another manner, the network side configures maximum feedback RI value (N1, N2) for two pieces of reporting information corresponding to two CSI-RSs respectively, for example, specifying the maximum feedback RI value (N1, N2) in the reporting setting configurations, or specifying the maximum feedback RI value (N1, N2) in a triggering signal for the reporting information, or specifying the maximum feedback RI value (N1, N2) in dedicated DCI.

For another example, in the NR system, the network side may transmit different NR-PDCCHs and/or NR-PDSCHs to the terminal device by use of two transmission nodes. For supporting such a transmission solution, the network side may transmit different CSI-RSs (recorded as CSI-RS 1 and CSI-RS 2 respectively, different CSI-RSs being distinguished through different CSI-RS resource indicators) by use of different transmission nodes and simultaneously configure the terminal device to measure two signals (there may be a CSI-RS resource setting configurations and a reporting setting configuration). For avoiding scheduling layers which exceed the demodulation capability of the UE, the NW may adopt the following two processing manners:

in a manner, the network side configures a maximum value of a sum of feedback RI values of two reference signals for CSI-RS 1 and CSI-RS 2 respectively, for example, specifying the maximum value of the sum of the feedback RI values in the CSI-RS setting configurations, or specifying the maximum value of the sum of the feedback RI values in a triggering signal for signal measurement, or specifying the maximum value of the sum of the feedback RI values in dedicated DCI.

In another manner, the network side configures the maximum value of the sum of the feedback RI values of two reference signals for two pieces of reporting information corresponding to two CSI-RSs respectively, for example, specifying the maximum value of the sum of the feedback RI values in the reporting setting configurations, or specifying the maximum value of the sum of the feedback RI values in a triggering signal for the reporting information, or specifying the maximum value of the sum of the feedback RI values in dedicated DCI.

Optionally, the terminal device receives second configuration information from the network side, the second configuration information including the number of a port for each reference signal and a sum of the numbers of ports for the multiple reference signals being smaller than or equal to the value corresponding to the capability of the terminal device.

For example, the network side may transmit different NR-PDCCHs and NR-PDSCHs to the terminal device by use of two transmission nodes. For supporting such a transmission solution, the NW may transmit different CSI-RSs (port amounts are recorded as P1 and P2 respectively and different CSI-RSs are distinguished through different CSI-RS resource indicators) on different transmission nodes and simultaneously configure the terminal device to measure the two signals (there may be the corresponding CSI-RS resource setting configurations and the reporting setting configurations). For avoiding scheduling layers which exceed the demodulation capability of the UE, a sum P1+P2 of all the port amounts configured by the network side for the terminal device to measure and report CSI does not exceed a maximum capability of the UE.

Optionally, the terminal device receives third configuration information from the network side, the third configuration information being configured to indicate that reference signals to be measured are the multiple reference signals.

Optionally, the number of the reference signals to be measured configured in the third configuration information is equal to the number of the PDCCHs required to be received at the same time, or equal to the number of the PDSCHs required to be received at the same time, or equal to the sum of the numbers of the PDCCHs and PDSCHs required to be received at the same time.

Optionally, in the embodiment of the application, a network device may further configure a constraint condition for the RI, for example, configuring the maximum value of the RI of a certain reference signal or the maximum value of the sum of the RIs of the multiple reference signals.

Optionally, the terminal device, after accessing a network, is in a default state that is a state of receiving one PDCCH (or PDSCH), and under a configuration of the network, may start entering a state of receiving multiple PDCCHs (or PDSCHs).

In such a manner, in the embodiment of the application, the terminal device measures multiple reference signals, the terminal device determines reporting information corresponding to each reference signal of the multiple reference signals and including the RI according to the measurement result, and the terminal device transmits the reporting information corresponding to each reference signal and including the RI to the network side, so that measurement and feedback of the reference signals are implemented to support transmission of multiple downlink channels.

Figure 3:
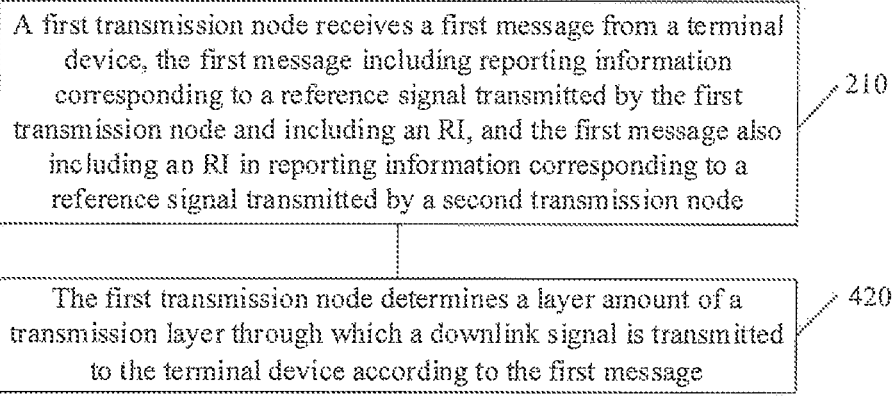
FIG. 3 is a schematic flowchart of a wireless communication method according to an embodiment of the application.

FIG. 3 is a schematic flowchart of a wireless communication method 200 according to an embodiment of the application. The method 200 includes at least part of contents in the following contents.

In the operation 210, a first transmission node receives a first message transmitted by a terminal device, the first message including reporting information including an RI and corresponding to a reference signal transmitted by the first transmission node, and the first message also including an RI in reporting information corresponding to a reference signal transmitted by a second transmission node.

In the operation 220, the first transmission node determines a layer amount of a transmission layer through which a downlink signal is transmitted to the terminal device according to the first message.

In an implementation mode, the first transmission node determines the layer amount of the transmission layer through which the downlink signal is transmitted to the terminal device according to the first message and a priority sequence of the first transmission node and the second transmission node.

Optionally, when priority of the first transmission node is higher than priority of the second transmission node, a value of the RI in the reporting information corresponding to the reference signal transmitted by the first transmission node is determined as the layer amount of the transmission layer through which the first transmission node transmits the downlink signal to the terminal device.

Optionally, when the priority of the first transmission node is lower than that of the second transmission node, a difference between a maximum amount of transmission layers supported by the terminal device and the value of the RI in the reporting information corresponding to the reference signal transmitted by the first transmission node is determined as the layer amount of the transmission layer through which the downlink signal is transmitted to the terminal device.

For example, in an NR system, a network side may transmit different NR-PDCCHs and NR-PDSCHs to a terminal device by use of two transmission nodes. For supporting such a transmission solution, the network side may transmit different CSI-RSs (recorded as a CSI-RS 1 and a CSI-RS 2 respectively, different CSI-RSs being distinguished through different CSI-RS resource indexes or indicators) on different transmission nodes and simultaneously configure the terminal device to measure the two signals (there may be corresponding CSI-RS resource setting configurations and reporting setting configurations). For avoiding scheduled transmission layers exceeding a demodulation capability of the terminal device, the terminal device may place two RIs in the same message during reporting, for example, as follows:

a message 1 transmitted to a transmission node 1 includes an RI 1 and an RI 2, and the message 1 transmitted to the transmission node 1 includes the RI 2; or, the message 1 transmitted to the transmission node 1 includes the RI 2, and the message 1 transmitted to the transmission node 1 includes the RI 1 and the RI 2; or, the message 1 transmitted to the transmission node 1 includes the RI 1 and the RI 2, and the message 1 transmitted to the transmission node 1 includes the RI 1 and the RI 2.

The network side may execute a corresponding operation in a predetermined manner. For example, the network side may specify that priority of the transmission node 1 is low. Then, when the transmission node 1 receives the RI 1 and the RI 2 and if the transmission node 2 transmits a downlink signal to the terminal device according to the RI 2, the transmission node 1 determines a layer amount (<=a layer amount N-RI corresponding to the maximum capability of the UE) for data transmitted by the transmission node 1 according to the capability of the terminal device of the RI 2.

In an implementation mode, the first transmission node performs negotiation with the second transmission node about the layer amount of the transmission layer through which the downlink signal is transmitted to the terminal device according to the first message.

In such a manner, in the embodiment of the application, the first transmission node determines the layer amount of the transmission layer for the downlink signal according to the reporting information corresponding to the reference signal transmitted by the first transmission node and including the RI and according to reporting information corresponding to a reference signal transmitted by other transmission node(s) and including an RI, so that system resource waste caused by the fact that the network side schedules excessive transmission layers for the terminal device to exceed the capability of the terminal device and the terminal device may not implement demodulation or discards part of data may be avoided.

Figure 4:
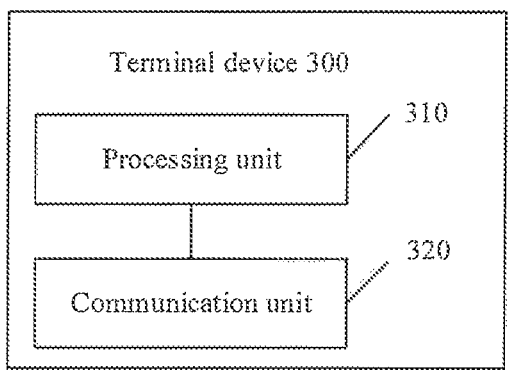
FIG. 4 is a schematic block diagram of a terminal device according to an embodiment of the application.

FIG. 4 is a schematic block diagram of a terminal device 300 according to an embodiment of the application. As shown in FIG. 4, the terminal device 300 includes a processing unit 310 and a communication unit 320.

The processing unit 310 is configured to measure multiple reference signals and determine reporting information corresponding to each reference signal of the multiple reference signals according to a measurement result, the reporting information including an RI.

The communication unit 320 is configured to transmit the reporting information corresponding to each reference signal and including the RI to a network side.

Optionally, the multiple reference signals are from multiple transmission nodes which may jointly serve the terminal device or from multiple downlink transmission beams.

Optionally, the communication unit 320 is further configured to:

transmit the reporting information corresponding to each reference signal and including the RI to a transmitter of the reference signal.

Optionally, a value of the RI in the reporting information corresponding to each reference signal is smaller than or equal to a value corresponding to a capability of the terminal device and/or smaller than or equal to the number of a port of the each reference signal configured for the terminal device.

Optionally, a sum of the values of the RIs in the reporting information corresponding to the multiple reference signals is smaller than or equal to the value corresponding to the capability of the terminal device.

Optionally, the communication unit 320 is further configured to:

transmit a first message to the transmitter of at least one first reference signal of the multiple reference signals, the first message including the reporting information corresponding to the first reference signal and including the RI.

The first message may further include the RI in the reporting information corresponding to at least one second reference signal of the multiple reference signals.

Optionally, the sum of the values of the RIs in the reporting information corresponding to the multiple reference signals may be greater than the value corresponding to the capability of the terminal device.

Optionally, the value of the RI in the reporting information corresponding to each reference signal may be smaller than or equal to a maximum value of the RI in the corresponding reporting information; or, the sum of the values of the RIs in the reporting information corresponding to the multiple reference signals may be smaller than or equal to a maximum value of the sum of the values of the RIs in the reporting information corresponding to the multiple reference signals.

Optionally, the processing unit 310 may be further configured to:

determine the maximum value of the RI in the reporting information corresponding to each reference signal according to the capability thereof; and determine the reporting information corresponding to each reference signal and including the RI according to the measurement result and the maximum value of the RI in the reporting information corresponding to the each reference signal.

Optionally, the maximum value of the RI in the reporting information corresponding to each reference signal may be obtained by rounding down a value obtained by dividing the value corresponding to the capability of the terminal device by the number of the multiple reference signals.

Optionally, the communication unit 320 may be further configured to:

receive first configuration information from the network side, the first configuration information being configured to indicate:

the maximum value of the RI in the reporting information corresponding to each reference signal; and/or, the maximum value of the sum of the values of the RIs in the reporting information corresponding to the multiple reference signals.

Optionally, the first configuration information of different reference signals may be distinguished through indexes of the reference signals.

Optionally, the first configuration information may be carried in a setting configuration of the reference signal, or carried in a triggering signal for triggering the terminal device to measure the reference signal, or carried in DCI dedicated to the first configuration information.

Optionally, the first configuration information of different reference signals may be distinguished through indexes of the reporting information.

Optionally, the first configuration information may be carried in a setting configuration of the reporting information, or carried in a triggering signal for triggering the terminal device for reporting, or carried in the DCI dedicated to the first configuration information.

Optionally, the communication unit 320 may be further configured to:

receive second configuration information from the network side, the second configuration information including the number of a port for each reference signal, and a sum of the numbers of ports for the multiple reference signals being smaller than or equal to the value corresponding to the capability of the terminal device.

Optionally, the communication unit 320 may be further configured to:

receive third configuration information from the network side, the third configuration information being configured to indicate that reference signals to be measured are the multiple reference signals.

Optionally, the terminal device 300 may correspond to a terminal device in the method embodiment, may implement corresponding operations of the terminal device and will not be elaborated herein for simplicity.

Figure 5:
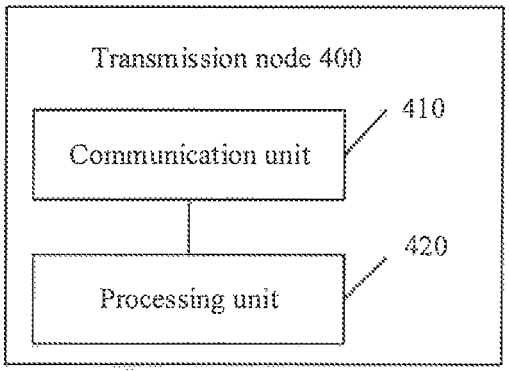
FIG. 5 is a schematic block diagram of a transmission node according to an embodiment of the application.

FIG. 5 is a schematic block diagram of a transmission node 400 according to an embodiment of the application. The transmission node 400 is a first transmission node. The transmission node includes a communication unit 410 and a processing unit 420.

The communication unit 410 is configured to receive a first message transmitted by a terminal device, the first message including reporting information corresponding to a reference signal transmitted by the first transmission node and including an RI, and the first message also including an RI in reporting information corresponding to a reference signal transmitted by a second transmission node.

The processing unit 420 is configured to determine a layer amount of a transmission layer through which a downlink signal is transmitted to the terminal device according to the first message.

Optionally, the processing unit 420 may be further configured to:

determine the layer amount of the transmission layer through which the downlink signal is transmitted to the terminal device according to the first message and a priority sequence of the first transmission node and the second transmission node.

Optionally, the processing unit 420 may be further configured to:

when priority of the first transmission node is higher than priority of the second transmission node, determine a value of the RI in the reporting information corresponding to the reference signal transmitted by the first transmission node as the layer amount of the transmission layer through which the first transmission node transmits the downlink signal to the terminal device.

Optionally, the processing unit 420 may be further configured to:

when the priority of the first transmission node is lower than that of the second transmission node, determine a difference between a maximum amount of transmission layers supported by the terminal device and the value of the RI in the reporting information corresponding to the reference signal transmitted by the first transmission node as the layer amount of the transmission layer through which the downlink signal is transmitted to the terminal device.

Optionally, the processing unit 420 may be further configured to:

perform negotiation with the second transmission node about the layer amount of the transmission layer through which the downlink signal is transmitted to the terminal device according to the first message.

Optionally, the transmission node 400 may correspond to a first transmission node in the method embodiment, may implement corresponding operations of the first transmission node and will not be elaborated herein for simplicity.

Figure 6:
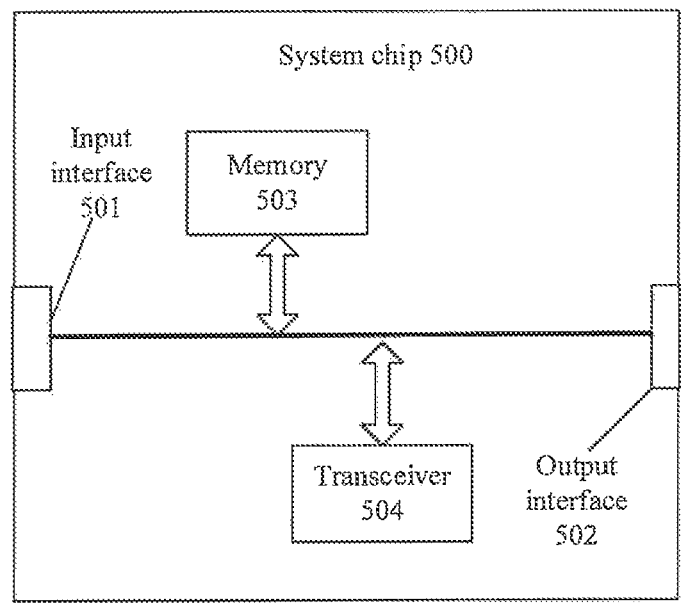
FIG. 6 is a schematic block diagram of a system chip according to an embodiment of the application.

FIG. 6 is a schematic structure diagram of a system chip 500 according to an embodiment of the application. The system chip 500 of FIG. 6 includes an input interface 501, an output interface 502, a processor 503 and a memory 504 which may be connected with each other through an internal communication connecting line. The processor 503 is configured to execute a code in the memory 804.

Optionally, when the code is executed, the processor 503 may implement the method executed by the transmission node in the method embodiment. For simplicity, no more elaborations will be made herein.

Optionally, when the code is executed, the processor 503 may implement the method executed by the terminal device in the method embodiment. For simplicity, no more elaborations will be made herein.

Figure 7:
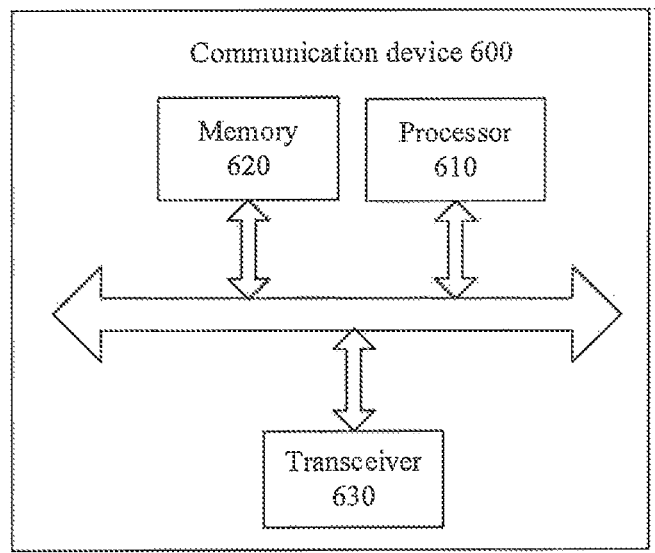
FIG. 7 is a schematic block diagram of a communication device according to an embodiment of the application.

FIG. 7 is a schematic block diagram of a communication device 600 according to an embodiment of the application. As shown in FIG. 7, the communication device 600 includes a processor 610 and a memory 620. Herein, the memory 620 may store a program code, and the processor 610 may execute the program code stored in the memory 620.

Optionally, as shown in FIG. 7, the communication device 600 may include a transceiver 630, and the processor 610 may control the transceiver 630 for external communication.

Optionally, the processor 610 may call the program code stored in the memory 620 to execute corresponding operations of the transmission node in the method embodiment. For similarity, elaborations will be omitted herein.

Optionally, the processor 610 may call the program code stored in the memory 620 to execute corresponding operations of the terminal device in the method embodiment. For similarity, elaborations will be omitted herein.

It is to be understood that the processor in the embodiment of the application may be an integrated circuit chip and has a signal processing capability. In an implementation process, each step of the method embodiment may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or other programmable logical device, a discrete gate or a transistor logical device and a discrete hardware component. Each method, step and logical block diagram disclosed in the embodiments of the application may be implemented or executed. The universal processor may be a microprocessor or the processor may also be any conventional processor and the like. The steps of the method disclosed in combination with the embodiments of the application may be directly embodied to be executed and completed by a hardware decoding processor or executed and completed by a combination of hardware and software modules in the decoding processor. The software module may be located in a mature storage medium in this field such as a Random Access Memory (RAM), a flash memory, a read-only memory, a programmable read-only memory or electrically erasable programmable read-only memory and a register. The storage medium is located in a memory, and the processor reads information in the memory, and completes the steps of the methods in combination with hardware.

It can be understood that the memory in the embodiment of the application may be a volatile memory or a nonvolatile memory, or may include both the volatile and nonvolatile memories. The nonvolatile memory may be a Read-Only Memory (ROM), a Programmable ROM (PROM), an Erasable PROM (EPROM), an Electrically EPROM (EEPROM) or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ES- DRAM), a Synchlink DRAM (SLDRAM) and a Direct Rambus RAM (DR RAM). It is to be noted that the memory of a system and method described in the disclosure is intended to include, but not limited to, memories of these and any other proper types.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in other manners. For example, the device embodiment described above is only schematic, and for example, division of the units is only logic function division, and other division manners may be adopted during practical implementation. For example, multiple units or components may be combined or integrated into other system(s), or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the application may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the application. The abovementioned storage medium includes: various media capable of storing program codes such as a U disk, a mobile hard disk, a ROM, a RAM, a magnetic disk or an optical disk.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. A wireless communication method, comprising:
   measuring, by a terminal device, multiple reference signals;
   determining, by the terminal device, reporting information corresponding to each reference signal of the multiple reference signals and comprising a Rank Indicator (RI) according to a measurement result;
   transmitting, by the terminal device, the reporting information corresponding to the each reference signal and comprising the RI to a network side; and
   receiving, by the terminal device, first configuration information from the network side, the first configuration information being configured to indicate at least one piece of following information:
      a maximum value of the RI in the reporting information corresponding to the each reference signal; or,
      a maximum value of a sum of values of the RIs in the reporting information corresponding to the multiple reference signals,
   wherein the first configuration information of different reference signals is distinguished through indexes of the different reference signals.

2. The method of claim 1, wherein transmitting, by the terminal device, the reporting information corresponding to the each reference signal and comprising the RI to the network side comprises:
   transmitting, by the terminal device, the reporting information corresponding to the each reference signal and comprising the RI to a transmitter of the each reference signal.

3. The method of claim 1, wherein transmitting, by the terminal device, the reporting information corresponding to the each reference signal and comprising the RI to the network side comprises:
   transmitting a first message to a transmitter of at least one first reference signal of the multiple reference signals, wherein
      the first message comprises reporting information comprising an RI and corresponding to the first reference signal, and
      the first message further comprises an RI in reporting information corresponding to at least one second reference signal of the multiple reference signals.

4. A terminal device, comprising: a processor and a transceiver, wherein
   the processor is configured to measure multiple reference signals and determine reporting information corresponding to each reference signal of the multiple reference signals and comprising a Rank Indicator (RI) according to a measurement result; and
   the transceiver is configured to transmit the reporting information corresponding to the each reference signal and comprising the RI to a network side,
   wherein the transceiver is further configured to:
   receive first configuration information from the network side, the first configuration information being configured to indicate at least one piece of following information:
      a maximum value of the RI in the reporting information corresponding to the each reference signal; or, a maximum value of a sum of values of the RIs in the reporting information corresponding to the multiple reference signals, wherein the first configuration information of different reference signals is distinguished through indexes of the different reference signals.

5. The terminal device of claim 4, wherein the multiple reference signals are from multiple transmission nodes for jointly serving the terminal device or from multiple downlink transmission beams.

6. The terminal device of claim 4, wherein the transceiver is further configured to:
transmit the reporting information corresponding to the each reference signal and comprising the RI to a transmitter of the reference signal.

7. The terminal device of claim 4, wherein a value of the RI in the reporting information corresponding to the each reference signal is smaller than or equal to a value corresponding to a capability of the terminal device, or is smaller than or equal to the number of a port of the each reference signal configured for the terminal device, or is smaller than or equal to a value corresponding to a capability of the terminal device and smaller than or equal to the number of a port of the each reference signal configured for the terminal device.

8. The terminal device of claim 4, wherein the sum of the values of the RIs in the reporting information corresponding to the multiple reference signals is smaller than or equal to a value corresponding to a capability of the terminal device.

9. The terminal device of claim 4, wherein the transceiver is further configured to:
transmit a first message to a transmitter of at least one first reference signal of the multiple reference signals, wherein
the first message comprises reporting information corresponding to the first reference signal and comprising an RI, and
the first message further comprises an RI in reporting information corresponding to at least one second reference signal of the multiple reference signals.

10. The terminal device of claim 9, wherein the sum of the values of the RIs in the reporting information corresponding to the multiple reference signals is greater than a value corresponding to a capability of the terminal device.

11. The terminal device of claim 4, wherein a value of the RI in the reporting information corresponding to the each reference signal is smaller than or equal to the maximum value of the RI in the reporting information corresponding to the each reference signal; or,
the sum of the values of the RIs in the reporting information corresponding to the multiple reference signals is smaller than or equal to a maximum value of the sum of the values of the RIs in the reporting information corresponding to the multiple reference signals.

12. The terminal device of claim 11, wherein the processor is further configured to:
determine the maximum value of the RI in the reporting information corresponding to the each reference signal according to a capability of the terminal device; and
determine the reporting information corresponding to the each reference signal and comprising the RI according to the measurement result and the maximum value of the RI in the reporting information corresponding to the each reference signal.

13. The terminal device of claim 12, wherein the maximum value of the RI in the reporting information corresponding to the each reference signal is obtained by rounding down a value obtained by dividing the value corresponding to the capability of the terminal device by the number of the multiple reference signals.

14. The terminal device of claim 4, wherein the first configuration information is carried in setting configurations of the different reference signals, or carried in a triggering signal for triggering the terminal device to measure the different reference signals, or carried in Downlink Control Information (DCI) dedicated to the first configuration information.

15. The terminal device of claim 4, wherein the first configuration information of different reference signals is distinguished through indexes of the reporting information.

16. The terminal device of claim 15, wherein the first configuration information is carried in a setting configuration of the reporting information, or carried in a triggering signal for triggering the terminal device for reporting, or carried in DCI dedicated to the first configuration information.

17. The terminal device of claim 4, wherein the transceiver is further configured to:
receive second configuration information from the network side, the second configuration information comprising the number of a port for the each reference signal, and a sum of the numbers of ports for the multiple reference signals being smaller than or equal to a value corresponding to a capability of the terminal device.

18. The terminal device of claim 4, wherein the transceiver is further configured to:
receive third configuration information from the network side, the third configuration information being configured to indicate that reference signals to be measured are the multiple reference signals.

* * * * *